2,562,002

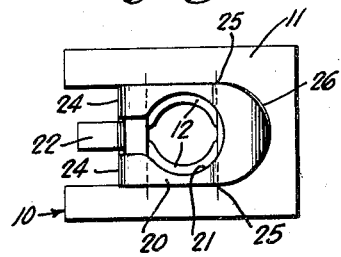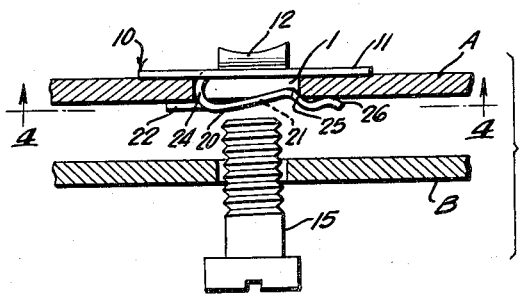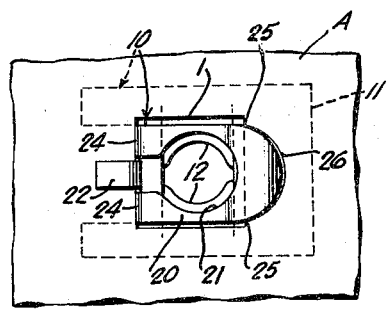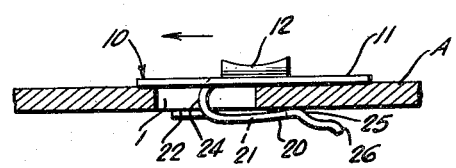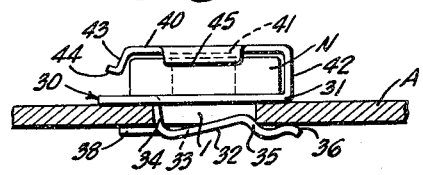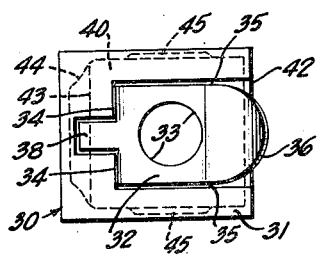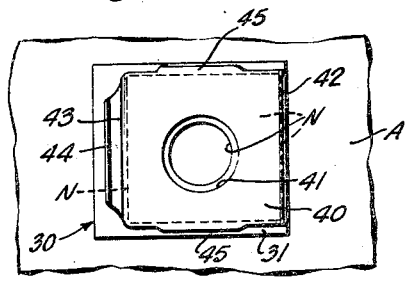
Inventor
GEORGE A. TINNERMAN
By H. G. Lombard
ATTORNEY Patented July 24, 1951

UNITED STATES PATENT OFFICE 2,562,002

FASTENING DEVICE

George A. Tinnerman, Cleveland, Ohio, assignor to Tinnerman Products, Inc., Cleveland, Ohio, a corporation of Ohio Application June 21, 1948, Serial No. 34,181

2 Claims. (Cl. 151—41.75)

This invention relates to attachable types of fastening devices designed for ready attachment to an apertured supporting part to provide the same with means for securing a cooperating part thereto or for securing another structure, object or article of manufacture to said supporting part. The invention is directed, more particularly, to clip type fastening devices which comprise means for attaching the fastener in a single, relatively small opening in a supporting part together with means for threadedly engaging a bolt or screw fastener to secure a cooperating part to the supporting part, or other means for retaining an object or part in secured relation to the supporting part. This application is a continuation in part of prior copending application Serial Number 26,896 filed May 13, 1948.

The improved fasteners of the invention are of the general type having attaching means in the form of a spring arm, or the like, which is applied to clasping engagement with the marginal edge portion of an opening in a part together with a locking shoulder or abutment also receivable in the opening to lock the spring arm in the applied fastening position of the fastener. In many assemblies, the nature of the installation is such that only a single, relatively small assembling opening or recess in a part to be secured is permissible or advisable to attach a nut or other other type of fastener for securing the parts of the installation. The most desirable attachment of a fastener in such instances is one in which the complete attachment is effected within the assembling opening in a manner which minimizes the attaching elements required on the fastener and which dispenses with the requirement for separate holes in the supporting part for the application of auxiliary attaching means such as rivets, welding and the like to retain the fastener in attached position.

A primary object of the invention is to provide a sheet metal fastening device of this character that may be inexpensively constructed with an improved type of attaching means in the form of a simplified clasping arm and cooperating retaining tab or abutment which are particularly suited for attachment in a relatively small opening in a part to retain the fastening device in fastening position against both axial and lateral displacement without the use of extraneous, auxiliary attaching means.

A further object of the invention is to provide a fastening device such as described in which the attaching means comprises a clasping arm and a cooperating tab defining oppositely extending abutments for retaining the fastening device in applied fastening position against axial as well as lateral displacement.

Another object of the invention is to provide a fastening device of the kind aforesaid in which the attaching arm is provided with a passage for a bolt or screw applied through the same opening in which the fastener is attached to threaded engagement with a nut or thread portion on the fastener body.

A further object of the invention is to provide such a fastening device in which the perforated clasping arm is adapted for attaching the fastener and for passing a cooperating bolt or screw, as aforesaid, and otherwise comprises cooperating shoulder elements for locking the fastener in attached fastening position.

Further objects and advantages, and other new and useful features in the construction, arrangement and general combination of parts of the invention will be readily apparent as the following description proceeds with reference to the accompanying drawings, for purposes of illustration but not of limitation, in which like reference characters designate like parts throughout, and in which:

Fig. 1 is a bottom plan view of a form of an attachable nut fastening device in accordance with the invention showing the formation of the improved attaching means;

Fig. 2 is a sectional view showing the fastening device of Fig. 1 in attached fastening position on a supporting part for receiving a bolt fastening securing a cooperating part thereto;

Fig. 3 is a sectional view showing the fastener in side elevation as initially applied to an opening in a supporting part;

Fig. 4 is a sectional view of Fig. 2 along line 4—4, looking in the direction of the arrows, showing the improved attaching means of the fastener in applied position in a generally rectangular opening in the supporting part; and, Fig. 5 shows in side elevation another embodiment of the fastening device in the form of a nut holder for retaining a conventional threaded nut in attached fastening position on a supporting part, represented in section;

Fig. 6 is a bottom plan view of the fastener per se of Fig. 5 showing the formation of the improved attaching means of the fastener in this form of the invention; and, Fig. 7 is a top plan view of Fig. 5.

The improved fastening devices of the invention are of general utility and may be readily designed as necessary for use in various installations in proportion to the size and contour of the parts secured. The fastening devices are particularly suited for use in providing an apertured supporting part with means for securing a cooperating part thereto by an operation taking place entirely from one side thereof as required in a blind location, for example. In this relation, each form of the invention relates to the provision of a fastening device having screw threaded fastener receiving means and otherwise comprising an attaching means designed to hold the fastening device in a self sustaining fastening position on the supporting part preparatory to the application of a threaded fastener thereto for securing a cooperating part to such supporting part. In other installations, the fastening devices may be provided in the manner of holders or retainers for ordinary threaded nuts or retaining means for securing a molding, conduit, cable or other object or article of manufacture. In any form, the fastener comprises an improved attaching means which is particularly suitable for attachment in a relatively small bolt opening or assembling opening in the supporting part and which provides for the complete attachment of the fastener within any such opening.

Referring now, more particularly, to the drawing, Figs. 1 to 4 inclusive show one embodiment of the improved fastener which comprises a strip, plate or other sheet metal body provided with means for threadedly engaging a bolt or screw for securing superposed apertured parts. The supporting part A to which the fastener is attached may be of any suitable material such as sheet metal, wood, fiber board, or the like; however, inasmuch as the instant invention is employed mainly in metallic structures, the supporting part is usually in the form of a metallic panel or plate-like element provided with the necessary bolt openings along which the object or part to be secured thereto extends in mounted position thereon. Such bolt openings are so provided as to serve both as an assembling opening for attaching the fastener and as a passage for the bolt applied to the fastener. The bolt opening 1 may be provided as a generally rectangular hole, or, as a simple circular aperture or of any other suitable design or configuration.

The fastener, designated generally 10, comprises a relatively small, inexpensive blank of sheet metal which is best provided in the manner of a simple section severed from standard sheet metal strip stock with minimum loss or waste of material. Any suitable sheet metal may be employed but preferably that of a spring metal nature such as spring steel or cold rolled steel having spring characteristics and otherwise of a much greater tensile and compressive strength than the supporting part A to which the fastening device is attached. The fastening device may assume any desired shape or configuration and in any form defines a base or body 11 which is provided with bolt or screw thread engaging means 12 adapted to receive a threaded fastener 15 for securing the superposed apertured parts A, B, in an installation such as shown in Fig. 2, for example.

The sheet metal base 11 is provided with integral tongues 12 or similar bolt engaging means which are pressed, extruded, or otherwise struck and formed to project upwardly out of the plane thereof for threadedly engaging a bolt or screw fastener, substantially in the manner of a nut. Preferably the sheet metal base 11 is so formed in the stamping operation as to present a slightly arched resilient base from which said tongues 12 extend upwardly in substantially ogee formation with the extremities thereof so spaced as to lie on a helix corresponding substantially to the pitch of the threads of the bolt or screw fastener 15 for most effective, uniform threaded engagement therewith.

The thread engaging elements 12 are best provided in the sheet metal body by an aperture intermediate spaced parallel slits which form cooperating tongues, or the like, having spaced extremities defining the desired thread or thread opening corresponding substantially to the root of the bolt or screw for threadedly engaging the thread thereof. Said tongues 12 otherwise are preferably formed to project upwardly out of the plane of the fastener base and are bent lengthwise in substantial ogee formation to provide for the maximum strength obtainable to withstand the tightening action of the bolt or screw as it is advanced to final applied fastening position.

Such thread engaging means may be pressed, stamped, extruded, or otherwise provided on the fastener in any suitable form or construction so long as the same threadedly engage with the thread of the bolt or screw and, in this relation, the present invention fully contemplates the provision of such thread engaging means in various other similar and related forms, as in the manner of a keyhole type of thread opening, or a perforated protuberance which is pressed from the sheet metal base and shaped to provide a helical thread or thread opening, or otherwise has the walls thereof tapped to provide a plurality of threads for threadedly engaging the bolt or screw. It has been found that such thread engaging means prepared in the form of cooperating, yieldable tongues 12 as shown, are most efficient and practical in that they are possessed of unusual inherent strength and will not collapse or pull through when the bolt is tightened, nor loosen under continuous strain and vibration in the installation. This takes place by reason of the fact that the sheet metal material from which such tongues are formed is of less thickness than the pitch or spacing between adjacent thread convolutions on the bolt or screw, wherefore the extremities of said tongues tend, more effectively, to move toward each other and dig into the grooves intermediate adjacent thread convolutions when the bolt or screw is tightened and otherwise become embedded in the root of the bolt or screw in locked, frictional fastening engagement therewith.

Thus, in the present example, the tongues 12 are shown as extending outwardly out of the plane of the fastener base 11 in substantial ogee design and provided preferably with notched extremities, defining substantial biting jaws adapted to cut into the root of the bolt and the adjacent thread surfaces thereon in positive locking relation therewith in the most effective manner. There is thereby eliminated the necessity for a separate, auxiliary locking means such as a lock nut or lock washer and this, in mass production methods of assembly makes possible considerable savings not only in the cost of such locking devices, but also, in the expense and labor involved in assembling operations and other added steps in manufacture which such auxiliary locking means require. It is to be understood, however, that the present invention is not limited in any manner or form to the illustrated construction of the thread engaging means but rather, comprehends also, various other similar and related forms of such tongues or equivalent thread engaging elements.

The attaching portion of the fastener is designed to hold the fastener in self-sustained position on the supporting part A, as shown in Fig. 2, with the stud engaging tongues 12 in alignment with the bolt opening 1 therein preparatory to the application of the bolt or screw 15 in securing a cooperating part B to said supporting part A by an operation taking place entirely from the outer side of the installation.

The attaching portion of the fastener comprises an apertured spring arm 20 which not only retains the fastener in attached fastening position over the bolt opening 1 but also provides a passage for the bolt or screw 15 applied to the thread or nut portion 12 on the base of the fastener. Such an apertured spring arm 20 is readily provided by a simple return bent extension on the fastener which depends from the central area of the fastener base adjacent the thread engaging means 12. Preferably a portion of the arm 20 is provided by spaced slits in the fastener base 11 so that the overall size of said fastener base is sufficient to overlap the bolt opening 1 more or less uniformly.

The attaching arm 20 is provided with a stud passage 21 and a lateral tab or projection 22 stamped therefrom which extends in opposite relation to the attaching arm 20. The tab or projection 22 defines an abutment lying in the same general plane as said attaching arm and may be provided in any suitable form either as a single tab or as a pair or more of cooperating projections extending in opposite relation to said arm 20. The return bent portion of said arm 20 provides a pronounced shoulder 24 adjacent said tab or abutment 22, and said arm extends gradually inwardly to define a shoulder 25 adjacent its free end with the extremity thereof terminating in an outwardly flared lip 26 which facilitates the initial application of the attaching arm over an edge of the bolt opening 1, as shown in Fig. 3. The arrangement otherwise is such that the return bent shoulder 24 is spaced from the shoulder 25 a distance approximating the space between opposing wall portions of the opening 1 so as to engage said wall portions in the attached position of the fastener and lock the same in such attached position against lateral displacement.

The fastener thus provided is easily and quickly attached to positive locked fastening position over the opening 1 in the supporting part with the thread engaging tongues 12 thereof aligned therewith simply by inserting the free end of the attaching arm 20 into and through said bolt opening and sliding the fastener in the direction of said free end of the arm as illustrated in Fig. 3. The outwardly flared lip 26 on the extremity of said arm facilitates this initial step in applying the fastener by causing a gradual outward flexing thereof over the edge of the bolt opening as necessary for the fastener to assume the position shown in Fig. 3 in which the lateral tab or projection 22 is received in said opening. The fastener is then pushed reversely in the direction of the arrow in Fig. 3 so that the return bent shoulder 24 engages the adjacent wall of the opening 1 while the tab or projection 22 overlaps and abuts the marginal portion of said opening in clasping relation therewith. In this position the shoulder 25 on the free end of the arm 20 is also received in the bolt opening 1 in engagement with an opposite wall thereof inasmuch as it is provided with a predetermined spacing from the shoulder 24 for this purpose. The shoulders 24, 25 accordingly cooperate in engagement with opposing walls of the bolt opening to lock the fastener against lateral displacement in fully applied fastening position on the supporting part A while the tab or projection 22 and the free end of the arm 20 overlap and abut opposing marginal portions of the opening to retain the fastener against axial displacement from said bolt opening. This is important when the cooperating bolt or screw 15 is brought into thread engaging relation with the fastener inasmuch as the tab 22 cooperates with the free end of the arm 20 to prevent the fastener from being pushed out of fastening position from the bolt opening when the bolt is initially applied or otherwise displaced therefrom when the bolt or screw is rotated to tightened fastening position with the fastener. The lateral tab or projection 22 preferably is in resilient gripping engagement with the supporting part while the free end of said arm 20 adjacent the shoulder 25 likewise is in resilient engagement with said part to maintain the shoulder 25 in positive engagement with the adjacent wall of the bolt opening under constant spring tension.

When the bolt opening 1 is provided in the form of a rectangular slot as shown in Fig. 4, the spaced shoulders 24, 25, engage opposing end walls of the slot, as aforesaid, while the side edges of the spring arm are disposed in abutting engagement with the adjacent straight sidewalls of the slot as a further means maintaining the fastener in fixed, nonrotative applied position on the supporting part. This is important upon insertion and turning of the bolt or screw fastening 15, Fig. 2, to threaded fastening engagement with the stud engaging elements 12 in securing the cooperating part B to the supporting part in completing any installation. In a blind assembly, such substantially fixed, nonrotative attachment of the fastener in self retained position on the supporting part is essential inasmuch as the reverse side of the supporting structure is not readily accessible and it becomes impossible or inconvenient for the operator to hold the fastener while inserting and threadedly engaging a bolt or screw with the thread engaging means thereof. In any case, the cooperating shoulders 24, 25 are located to correspond with the contour of the bolt opening employed to engage opposing walls thereof and thereby lock the fastener rigidly in attached position, as aforesaid. It is thereupon a simple matter to complete an installation securing the parts A, B, by passing the bolt 15 through the stud passage 21 in the spring arm 20 into threaded engagement with the thread engaging means 12 on the fastener base.

In the event that it is desired to remove the fastener from attached position, a suitable tool is employed to push the fastener to the position shown in Fig. 3 and the fastener base wedged from the supporting part as necessary for the abutment 22 to clear the bolt opening, whereupon the fastener may be slid reversely to disengage the attaching arm 20 from the assembling opening and permit the fastener to be removed.

It will be appreciated that in the use of these one-piece fastening devices of the invention the fasteners are admirably suited for attachment in relatively small openings in close quarters. Also, various fastening installations may be provided which are relatively light in weight and superior and more advantageous in many respects than those secured by clinch-on nut devices embodying conventional threaded nuts which require not only lock washers to provide a locked assembly, but also some extraneous means such as spot welding, riveting or cage devices to retain the nuts in applied position on the support preparatory to the application of the bolt fastening thereto.

Figs. 5-7 inclusive disclose another form of fastener in accordance with the invention which is provided as a holder for attaching a standard nut or tapped plate in fastening position in an assembly. The fastener 30 is constructed with attaching means in the form of spring arm 32 provided with a stud passage 33 in a construction which is substantially similar in application and use to that described with reference to Figs. 1-4 inclusive. The attaching arm 32, however, is provided in an alternate construction by stamping the same directly from the fastener base 31 to project outwardly out of the plane thereof and thereby define the pronounced shoulder 34 at the junction to the fastener base and the cooperating shoulder 35 adjacent the free end of said arm. These shoulders 34, 35, are spaced a distance approximating the space between opposing walls of the bolt opening 1 in the supporting part A so as to engage said walls in the attached position of the fastener and lock the same in such attached position against lateral displacement. The free end of said arm 32 outwardly of the shoulder 35 defines a resilient spring clasping tongue which preferably terminates in an outwardly flared lip 36 that facilitates the initial application of the fastener to attached fastening position. A laterally extending tab or other projection 38 is stamped from the fastener base 31 together with the attaching arm 32 to extend in the general plane of said arm in opposite relation thereto. The tab 38, accordingly, is adapted to serve as an abutment together with the free end of the arm 32 to hold the fastener in attached position against axial displacement from the bolt opening 1 in the supporting part in substantially the manner described with reference to the similar elements of the fastener of Figs. 1-4 inclusive.

An extension on the fastener base 31 is bent into an overlying spring arm 40 provided with a bolt passage 41 and a web portion 42 connecting said spring arm 40 in spaced relation to the fastener base 31. A downwardly extending shoulder or flange 43 on the free end of said spring arm 40 terminates preferably in an outwardly flared guide surface 44, while side flanges 45 extend downwardly from opposite sides of said spring arm 40. The arrangement is such that a suitable nut N is readily snapped between the overlying spring arm 40 and the base 31 of the fastener and, in such assembled relation, the shoulder or flange 43 on the free end of the spring arm 40 engages the outer end face of the nut and the web portion 42 engages the opposite end face thereof while the side flanges 45 engage the side faces of the nut to retain the same within the nut holder and prevent turning of the nut when a cooperating bolt or screw is applied thereto and rotated to tightened fastening position. Assembly of the nut with the nut holder is facilitated by the outwardly flared guide surface 44 on the free end of the spring arm in that the end face of the nut on being initially applied, engages said guide surface in a camming action to spread the spring arm 40 apart from the fastener base 31 as necessary to admit the nut to assembled relation within the nut holder, whereupon the shoulder 43 on the free end of the spring arm snaps into engagement with the adjacent outer end face of the nut, as aforesaid.

The nut holder is attached in the bolt opening 1 in the supporting part either prior to or after the nut N is assembled therewith substantially as shown in Fig. 5 and the application of the attaching hook 32 to the bolt opening 1 is substantially the same as that described in reference to Figs. 1-4 inclusive. Accordingly, with the combined nut and nut holder attached as shown in Fig. 5, a cooperating part may be readily secured to the supporting part A by a suitable bolt or screw applied through the bolt passage 33 in the spring arm 32 into threaded engagement with the nut N carried by the nut holder.

The fastener in any form preferably is constructed of relatively thin sheet metal, the thickness of which is selected according to service requirements and the predetermined size of the parts secured. The fasteners are most effective when provided of spring metal suitably spring tempered and otherwise treated to give the desired toughness and hardness, particularly in the case of devices which are used in installations where extreme vibratory motion takes place. A cheap but effective fastener may be provided from cold rolled metal, such as cold rolled steel, which is untempered but of a spring metal nature and capable of providing an effective and reliable fastening means.

While the invention has been described in detail with specific examples, such examples are intended as illustrations only inasmuch as changes in the construction and arrangement of the fasteners within the broad scope of the instant disclosure are fully contemplated.

What is claimed is:

1. A fastener for attachment to a part solely in the bolt or screw opening provided in said part, said fastener comprising a sheet metal body providing a base larger than said opening in said part and adapted to bear on said part, said base having an aperture and carrying means adjacent said aperture for engaging a bolt or screw, and a return bent portion projecting from said base defining an arm extending in the same general direction as said base, said arm being smaller than said base and having an open area providing a bolt or screw passage aligned with the aperture in said base, said arm being of such size as to be fully receivable in the opening in said part from one side of said part to extend through said opening and engage the other side of said part in overlapping relation to a marginal portion of said opening, and an abutment provided from the material of said arm and bent to extend in the opposite direction from said arm, said abutment being engageable with said other side of said part in overlapping relation to an opposite marginal portion of said opening.

2. A fastener for attachment to a part solely in the bolt or screw opening provided in said part, said fastener comprising a sheet metal body providing a base larger than said opening in said part and adapted to bear on said part, said base having an aperture and carrying means adjacent said aperture for engaging a bolt or screw, and a return bent portion projecting from said base defining an arm extending in the same general direction as said base, said arm being smaller than said base and having an open area providing a bolt or screw passage aligned with the aperture in said base, said arm being of such size as to be fully receivable in the opening in said part from one side of said part to extend through said opening and engage the other side of said part in overlapping relation to a marginal portion of said opening, an abutment provided from the material of said arm and bent to extend in the opposite direction from said arm, said abutment being engageable with said other side of said part in overlapping relation to an opposite marginal portion of said opening, said arm defining a projecting shoulder adjoining said fastener base adapted to engage the wall of said opening, and another shoulder on said arm engageable with the wall of said opening in spaced relation to said projecting shoulder.

GEORGE A. TINNERMAN.

REFERENCES CITED

The following references are of record in the file of this patent:

UNITED STATES PATENTS

| Number | Name | Date |
|---|---|---|
| 2,198,439 | Kost | Apr. 23, 1940 |
| 2,222,449 | Tinnerman | Nov. 19, 1940 |
| 2,252,904 | Todd | Aug. 19, 1941 |
| 2,258,555 | Kost | Oct. 7, 1941 |
| 2,258,845 | Burke | Oct. 14, 1941 |
| 2,399,958 | Tinnerman | May 7, 1946 |
| 2,516,274 | Tinnerman | July 25, 1950 |